United States Patent [19]

Braithwaite

[11] 4,288,240
[45] Sep. 8, 1981

[54] PLUNGER MOUNTING MECHANISM IN A GLASSWARE FORMING MACHINE

[75] Inventor: David Braithwaite, Doncaster, England

[73] Assignee: Emhart Industries, Inc., Farmington, Conn.

[21] Appl. No.: 175,614

[22] Filed: Aug. 6, 1980

[30] Foreign Application Priority Data

Aug. 29, 1979 [GB] United Kingdom ............... 29860/79

[51] Int. Cl.³ ...................... C03B 11/05; C03B 11/16
[52] U.S. Cl. ...................................... 65/246; 65/305; 65/318; 65/322; 65/361
[58] Field of Search ................. 65/246, 305, 308, 318, 65/322, 362, 361

[56] References Cited

U.S. PATENT DOCUMENTS

| Re. 27,153 | 7/1971 | Donnelly | 65/246 X |
| 1,909,374 | 5/1933 | McNamara | 65/246 X |
| 3,305,344 | 2/1967 | Colchagoff | 65/362 |
| 4,010,021 | 3/1977 | Foster | 65/361 |

*Primary Examiner*—Richard V. Fisher
*Attorney, Agent, or Firm*—H. Samuel Kieser

[57] ABSTRACT

In glassware forming apparatus a parison is formed at a blank station by pressing a gob of molten glass using a plunger and plunger actuating means mounted on a carriage, the carriage also carrying a neck ring and being reciprocable so that a parison held by the neck ring is transported from the blank station to a further station in the apparatus and the neck ring is returned to the blank station after release of the parison at the further station and prior to the formation of the next parison at the blank station. The plunger mounting and actuating means is constructed to allow the plunger to float laterally and vertically during formation of the parison.

7 Claims, 1 Drawing Figure

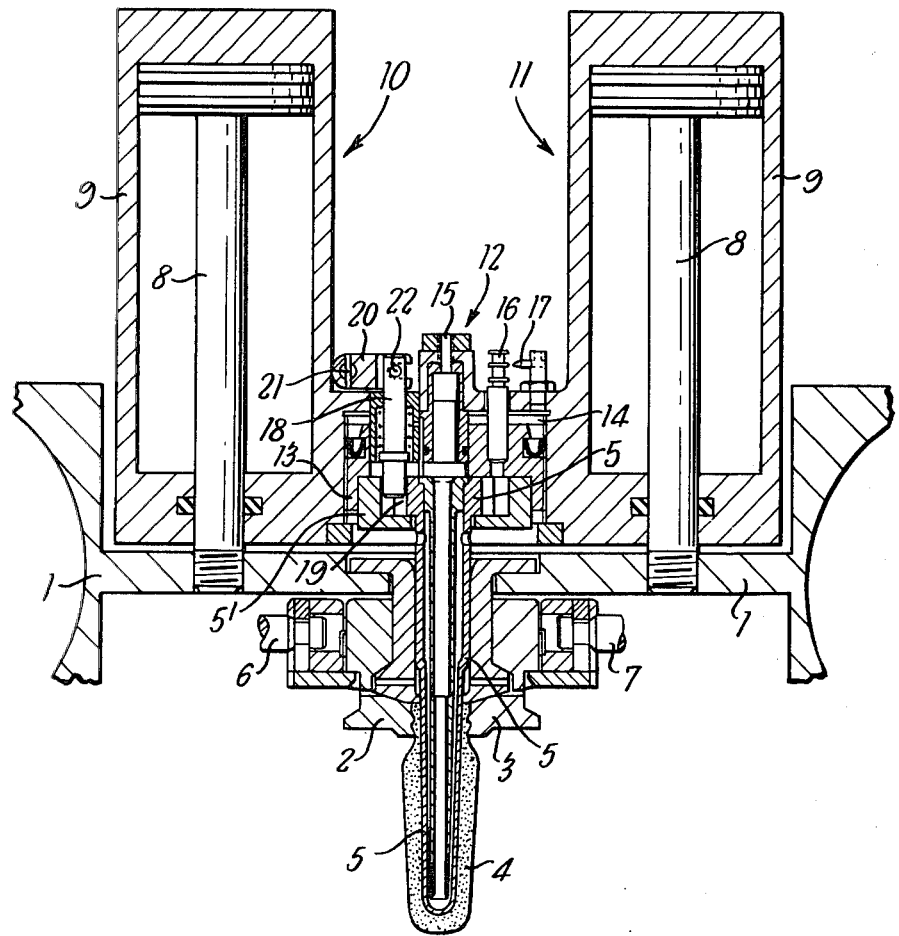

PLUNGER MOUNTING MECHANISM IN A GLASSWARE FORMING MACHINE

BACKGROUND OF THE INVENTION

This invention relates to glassware forming machines, and more particularly to glassware forming machines in which a parison is formed from a gob of molten glass by pressing in a top-opening parison or blank mould.

Such a glassware forming machine is described in British Patent Specification No. 1,491,859 (corresponding to U.S. Pat. No. 4,010,021). In this glassware forming machine there is provided a combined gob guide and plunger mechanism which is reciprocable between a position in which two gob guides direct gobs of molten glass into a pair of parison moulds at the blank station of a three station glassware forming machine section and a position in which a pair of plungers are thrust into the moulds to form a pair of parisons. The parisons are held by neck rings on a carriage which is reciprocable between the first and second stations of the glassware forming machine so that a formed parison may be transferred by the neck rings to the second station and released, after which the neck rings return to the first station for subsequent parison formation.

SUMMARY OF THE INVENTION

According to the present invention there is provided a glassware forming machine comprising at least one upwardly open position mould in which parisons are formed from gobs of molten glass at a blank station and a carriage which carries a neck ring, the carriage being reciprocable between a first position at which the neck ring engages a parison formed in the parison mould and a second position at which the neck ring may open to release the parison at a further station of the machine, the carriage further carrying a plunger and means for moving the plunger between a raised inoperative position and a lowered operative position, and the plunger being moved to the lowered operative position when the carriage is in the first position so that the plunger projects into the parison mould to form a parison from a gob of molten glass at the blank station.

Further in accordance with the present invention there is provided a multiple section glassware forming machine of which an individual section comprises first and second stations, at least one upright top-opening parison mould for use in forming a parison at the first station, a carriage which carries a neck ring, means for reciprocating the carriage between a first position at which the neck ring engages a parison formed in the parison mould and a second position at which the neck ring may open to release the parison at the second station, piston and cylinder actuating means mounted on the carriage and a plunger supported by the piston and cylinder actuating means and movable thereby between a raised inoperative position and a lowered operative position in which, in the first position of the carriage, the plunger projects into the parison mould to form a parison from a gob of molten glass.

BRIEF DESCRIPTION OF DRAWING

The present invention will be better understood from the following detailed description of one embodiment thereof which is made, by way of example, with reference to the accompanying diagrammatic drawing, the single FIGURE of which is a transverse section through a part of a carriage supporting a neck ring which engages a parison.

DESCRIPTION OF THE PREFERRED EMBODIMENT

Referring to the drawing there is shown a transverse cross-section through a carriage 1 which is reciprocable longitudinally by means not shown in the drawing. The carriage 1 supports a neck ring having opposed parts 2 and 3 which combine with a top-opening parison mould (not shown) in the formation of a parison 4 from a gob of molten glass by pressing with a plunger 5. The carriage 1 illustrated in the accompanying drawing is a modified form of the carriage described and illustrated in the aforementioned U.S. Pat. No. 4,010,021 to which reference is made for further disclosure of the carriage, the means by which the carriage is reciprocated, and the structure of the top-opening parison mould. These disclosures of the said U.S. Pat. No. 4,010,021 are incorporated herein by reference. However, it will be appreciated that the present invention is not limited in its application to the particular reciprocable carriage of U.S. Pat. No. 4,010,021 and the present invention may be used, for example, in any of the embodiments of a glassware forming machine using a top-opening parison mould described in co-pending U.S. Patent Application Ser. Nos. 24,646 and 24,826, both filed Mar. 28, 1979.

The neck ring parts 2 and 3 support the parison 4 when the parison body mould has been removed preparatory to movement of the parison from the first station of a glassware forming machine section to a second station of the machine section, as described in the aforementioned U.S. Patent. The neck ring parts 2 and 3 are operable through members 6 and 7 by means (not shown and forming no part of the present invention) to release the parison 4 at the second station.

Secured to the carriage 1 symmetrically about the longitudinal centre line thereof are two piston rods 8, 8 which are contained in respective cylinders 9, 9, thus constituting similar pneumatic piston and cylinder devices 10 and 11 which are operated simultaneously. The cylinders 9, 9 support between them a mounting assembly 12 which supports the plunger 5, the mounting assembly 12 and the plunger 5 together constituting a press head for pressing a parison from a gob of molten glass.

The mounting assembly 12 includes a fluid motor having a piston 13 which is movable in a cylinder 14. Pneumatic pressure is applied to the cylinder from a source (not shown) through a central passage 15.

Located within a lower recess in the piston 13 is the plunger 5 which consists essentially of two parts, the central plunger 5 and a plunger retaining member 5' which has a central aperture through which the plunger 5 itself extends. The central plunger 5 is not a close fit in the aperture in the base of the plunger retaining member 5', the central plunger 5 thus being allowed to float laterally relative to the piston 13 and the plunger retaining member 5'.

Because the mounting assembly 12 supports the plunger 5 in a floating manner through the fluid motor comprised by the piston 13 and cylinder 14, lowering of the press head by actuation of the piston and cylinder devices 10 and 11 does not force the plunger 5 into a predetermined position in the parison mould but the plunger 5 is able to adapt its position to the quantity of molten glass in the parison mould so that the molten glass is caused exactly to fill the parison-forming cavity defined by the parison mould, which includes the neck ring parts 2 and 3.

In the embodiment of the invention illustrated in the accompanying drawing the position of the plunger 5 in the parison mould during parison formation is indicated through a pin 16 which is press fitted into the piston and has an upwardly extending portion having three lands adjacent to a fixed pointer device 17. The location of the middle one of the three lands on the pin 16 adjacent the pointer 17 indicates the correct quantity of molten glass in the gob, while the positioning of the upper land adjacent the pointer 17 indicates too little glass, and the positioning of the lower land adjacent the pointer 17 indicates too much glass.

The plunger 5 is maintained in position in the piston 13 by a locking pin 18 which engages in a slot 19 machined in the plunger, the engagement between the locking pin 18 and the slot 19 permitting the lateral floating of the central plunger 5 previously mentioned.

When the plunger 5 is to be removed from the press head the locking pin 18 is raised by movement of a lever (not shown) which rotates member 20 about axis 21 to lift the locking pin out of the slot 19 through the action of pin 22. The plunger 5, 5' may thus be rotated through 90° and removed from the mounting assembly 12.

Apparatus in accordance with the present invention may be employed in a glassware forming machine which utilises only a single parison mould, or in a glassware forming machine of the double gob or triple gob type. In the latter cases the mounting assembly 12 will include a further fluid motor or motors each supporting another plunger 5. Each plunger 5 is thus enabled to adapt to the quantity of molten glass present in its associated parison mould.

Apparatus in accordance with the present invention provides the advantage over the apparatus described in the aforementioned U.S. Pat. No. 4,010,021 of a reduction in the time between the loading of a gob of molten glass to the parison mould and the time at which the molten glass is pressed to form the parison. This reduction in the "load to press" time results because the plunger has less distance to cover before contacting the molten glass in the parison mould.

Location of the plunger mechanism in the press head on the neck ring carriage avoids the necessity of aligning the plunger immediately prior to each pressing operation. Because the plunger mechanism is fixed to the neck ring carriage the plunger mechanism is aligned with the neck ring during manufacture.

Location of the plunger mechanism on the neck ring carriage in accordance with the present invention also enables the height of the glassware forming machine to be reduced as compared with the machine described in the aforementioned U.S. Patent because overhead manifolds which previously carried the plunger mechanism and the operating air may be eliminated. Also apparatus in accordance with the present invention effects a reduction in apparatus because there is no need of a separate mechanism to move the plunger mechanism between an operative position over the parison mould and an inoperative position displaced therefrom.

The apparatus as hereinbefore described with reference to the accompanying drawings also provides an improved method of retaining the plunger in the mounting assembly.

The use of apparatus in accordance with the present invention also provides an improvement in the accuracy of loading a gob of molten glass into the solid blank of the parison mould because the gob delivery equipment can be specifically located in the optimum position during the setting-up of the apparatus and may remain in that optimum position during successive cycles of operation of the glassware forming machine.

I claim:

1. A glassware forming machine comprising at least one upwardly open parison mould in which parisons are formed from molten glass at a blank station, a carriage, and, supported on the carriage, a neck ring, a plunger, and means for moving the plunger between a raised inoperative position and a lowered operative position, the carriage being reciprocable between a first position at which the neck ring engages a parison formed in the parison mould and a second position at which the neck ring opens to release the parison at a further station of the machine, and the plunger being moved to the lowered operative position when the carriage is in the first position so that the plunger projects through the neck ring into the parison mould to form a parison from a gob of molten glass at the blank station.

2. A glassware forming machine according to claim 1 wherein the means for moving the plunger between the raised inoperative position and the lowered operative position comprises piston and cylinder actuating means and a mounting assembly for the plunger, the mounting assembly being connected to the movable part of the piston and cylinder actuating means.

3. A glassware forming machine according to claim 2 wherein the mounting assembly for the plunger includes a fluid motor having a first part in a fixed position on the mounting assembly and a second part which is movable with respect to the first part and which forms a floating piston supporting the plunger.

4. A multiple section glassware forming machine of which an individual section comprises first and second stations, at least one upright top-opening parison mould for use in forming a parison at the first station, a carriage, a neck ring supported on the carriage, means for reciprocating the carriage between a first position at which the neck ring engages a parison formed in the parison mould and a second position at which the neck ring may open to release the parison at the second station, piston and cylinder actuating means mounted on the carriage, and a plunger supported by the piston and cylinder actuating means and movable thereby between a raised inoperative position and a lowered operative position in which, in the first position of the carriage, the plunger projects through the neck ring into the parison mould to form a parison from a gob of molten glass.

5. A glassware forming machine according to claim 4 wherein the piston and cylinder actuating means comprises a pair of piston and cylinder devices, the pistons of which are secured to the carriage symmetrically about a centre line of the carriage, and the cylinders of which support, between the said cylinders, a mounting assembly for the plunger.

6. A glassware forming machine according to claim 5 wherein the mounting assembly for the plunger includes a fluid motor having a first part in a fixed position on the mounting assembly and a second part which is movable with respect to the first part and which forms a floating piston supporting the plunger.

7. A glassware forming machine according to claim 6 which includes a plurality of parison moulds and a corresponding plurality of plungers, each of the plungers being supported by a floating piston and each floating piston being part of a separate fluid motor in the mounting assembly.

* * * * *

UNITED STATES PATENT AND TRADEMARK OFFICE
CERTIFICATE OF CORRECTION

PATENT NO. : 4,288,240
DATED : September 8, 1981
INVENTOR(S) : David Braithwaite It is certified that error appears in the above—identified patent and that said Letters Patent is hereby corrected as shown below:

Column 1, Line 31 - "position" should read --parison--

Signed and Sealed this

Tenth Day of November 1981

[SEAL]

Attest:

GERALD J. MOSSINGHOFF

Attesting Officer    Commissioner of Patents and Trademarks